United States Patent
Norman

(10) Patent No.: US 9,752,072 B2
(45) Date of Patent: Sep. 5, 2017

(54) PROPPING COMPOSITIONS FOR ENHANCING FRACTURE CONDUCTIVITY

(71) Applicant: Halliburton Energy Services, Inc., Houston, TX (US)

(72) Inventor: Lewis A. Norman, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/558,813

(22) Filed: Dec. 3, 2014

(65) Prior Publication Data

US 2015/0087564 A1  Mar. 26, 2015

Related U.S. Application Data

(62) Division of application No. 13/282,843, filed on Oct. 27, 2011.

(51) Int. Cl.
| | |
|---|---|
| *C09K 8/80* | (2006.01) |
| *C09K 8/64* | (2006.01) |
| *C09K 8/66* | (2006.01) |
| *C09K 8/68* | (2006.01) |
| *C09K 8/70* | (2006.01) |
| *C04B 28/02* | (2006.01) |
| *C09K 8/473* | (2006.01) |

(52) U.S. Cl.
CPC ............ *C09K 8/80* (2013.01); *C04B 28/02* (2013.01); *C09K 8/473* (2013.01); *C09K 8/64* (2013.01); *C09K 8/665* (2013.01); *C09K 8/68* (2013.01); *C09K 8/70* (2013.01); *C09K 2208/08* (2013.01); *C09K 2208/10* (2013.01); *C09K 2208/28* (2013.01)

(58) Field of Classification Search
None
See application file for complete search history.

(56) References Cited

U.S. PATENT DOCUMENTS 7,528,096 B2 * 5/2009 Brannon .................. C09K 8/80
166/292

* cited by examiner

*Primary Examiner* — Jeffrey Washville
(74) *Attorney, Agent, or Firm* — McDermott Will & Emery LLP

(57) ABSTRACT

Propping compositions comprising: a hardenable, liquid external phase comprising an element selected from the group consisting of: a cement, a cement foam, a polymer, a resin, an aluminum, a flowable carrier fluid, and any combination thereof; and an internal phase that is either gas or liquid and that is immiscible with the external phase; wherein the internal phase exits the propping composition as the hardenable external phase hardens, leaving behind an hardened, interconnected porous network. Some propping compositions may require contact with a treatment for removal from the hardenable external phase and the treatment for removal may comprise at least one material selected from the group consisting of: an acid, a base, a chelant, an oxidizer, a solvent, and any combination thereof.

7 Claims, No Drawings

PROPPING COMPOSITIONS FOR ENHANCING FRACTURE CONDUCTIVITY

CROSS-REFERENCE TO RELATED APPLICATIONS

This application is a divisional of U.S. application number Ser. No. 13/282,843, published as US2013/0105167 and titled "Novel Method for Enhancing Fracture Conductivity," the entirety of which is hereby incorporated by reference.

BACKGROUND

The present invention generally relates to the field of hydraulic fracturing, and more particularly, to propping compositions for use with fracturing fluids, and their use to enhance fracture conductivity.

Hydraulic fracturing is a stimulation process that can increase the rate at which oil or gas can be produced. One of the first steps in hydraulic fracturing is to introduce large amounts of fracturing fluids into a formation in order to create and/or extend fractures. These fractures allow oil or gas to travel more easily from the rock pores, where the oil or gas is trapped, to the production well. A hydraulic fracture is formed by pumping a fracturing fluid into a wellbore at a rate sufficient to increase the pressure downhole to a value in excess of the fracture gradient of the formation rock. This pressure can create a crack in the formation and allow the fracturing fluid to enter and extend the crack farther into the formation. This cracking can result in a fracture network. For example, a two winged fracture can be formed in a single vertical plane that is perpendicular to a plane along the least principle stress.

A porous material (e.g., formation rock containing hydrocarbons) may be characterized by several key parameters that affect the extraction rate and ultimate recovery of hydrocarbons. For example, each rock layer can have a certain porosity, which is the percentage of pore volume or void space within a rock that can contain hydrocarbons. This void volume is typically filled with a mixture of oil, gas, and brine water. In other words, the fractions of these three components can add up to the total saturation, which corresponds to about 100% of the void space. For example, if porosity is 25% of the total rock volume, then a 50% oil saturation would mean that 12.5% of the total rock volume is filled with oil.

Certain formations have lower effective porosity because of blockages such as gases trapped in the formation matrix, the various layers of rock, or in the bedding planes. As used herein, "effective porosity" refers to the interconnected pore volume or void space in a rock that contributes to fluid flow or permeability. Total porosity is considered to be the total void space regardless of whether it affects fluid flow.

On one hand, the total porosity of a formation sets the theoretical upper limit for how much hydrocarbon can be recovered. In practice, it is difficult to obtain or come close to obtaining the theoretical limit because rock pores usually contain other fluids besides hydrocarbons and the actual recovery of hydrocarbons is limited by the interconnectivity of a porous material between its pores. This interconnectivity can impact the permeability, which is a measure of a porous material's ability to transmit fluid. In order to optimize the recovery of hydrocarbons, the ideal situation is to have a high porosity material whose pore spaces or void volumes are well interconnected.

Fracture acidizing is one known method of enhancing permeability. This method involves pumping acid into a formation at high enough pressures to cause the formation to crack. The acid etches certain rock faces to increase the permeability of the formation. Another method of enhancing permeability is matrix acidizing in which acids are introduced into a formation at pressures below the fracture pressure of the formation where the acid reacts with soluble substances in the formation matrix.

A potential problem in these fracturing/stimulation treatments is the closure and healing of fractures. To keep fractures open after the injection of fracturing fluid has stopped, solid proppant particulates are usually introduced. Commonly used proppant particulates include, but are not limited to, sand, resin-coated sand, ceramics, and the like. In order for proppant particulates to be effective, their load bearing strength must exceed the closure pressure of the fracture. As used herein, "closure pressure" indicates the pressure at which a fracture effectively closes. In practice, the closure pressure is not a constant value and typically increases during a fracturing operation. For example, after fracturing has taken place and production of the well has begun, pore pressures typically decrease while the stress on the proppant can increase. It is important that the proppant is able to withstand the closure pressure throughout production so that the proppant pack is a permeable conduit through which the formation fluids can flow.

With stimulation techniques being used at greater depths and higher closure pressures, there are several challenges facing current proppant technology. Under these conditions, it is far more likely that the load on each proppant grain exceeds the grain's ability to support a load, thus leading to proppant breaking. It is believed, for example, that spherical proppants face high loads due to the localization of stress at each point where the proppants contact other proppant grains and/or the formation fracture face.

Proppant debris can also lead to the obstruction of pathway. For example, when proppant particulates shatter, the pieces fill the pore spaces of the proppant bed, often resulting in huge loss of flow capacity for hydrocarbons. While certain proppant particulates such as bauxite have high load bearing strength capabilities, typically less proppant is used and much longer fractures are needed.

Traditional proppant particulates also face theoretical limitations that limit the flow of hydrocarbons through the proppant pack. A proppant pack is essentially a porous medium whose porosity is determined by the void space between the packed proppant particulates. Because of the geometrical constraints of packing, it is believed that a traditional proppant pack (e.g., spherical proppant particulates) typically cannot have a porosity greater than about 35%. This low theoretical porosity can limit the permeability and fracture conductivity of the proppant packs, which in turn, can limit the recovery of hydrocarbons.

DETAILED DESCRIPTION

The present invention generally relates to the field of hydraulic fracturing, and more particularly, to propping compositions for use with fracturing fluids, and their use to enhance fracture conductivity.

Of the many advantages of the propping compositions of the present invention, only a few of which are discussed or alluded to herein, the propping compositions and methods of the present invention can enhance the fracture conductivity of subterranean formations.

As used herein, "fracture conductivity" refers to a parameter used to optimize the productivity of a well after fracture treatment. Fracture conductivity is the fracture permeability multiplied by the fracture width. As used herein, "permeability" refers to a porous material's ability to transmit fluids, usually measured in darcies (D) or millidarcies (mD). Typically, permeable formations that transmit fluids readily tend to have many large, well-connected pores. Impermeable or low permeability formations, such as shales and siltstones, tend to be finer grained or of a mixed grain size, with smaller, fewer, or less interconnected pores. Higher permeability applications such as frac-pack may also benefit from increased permeability provided by the present invention.

Without being limited by theory, it is believed that the present invention can increase fracture conductivity by increasing the porosity of fracture packs created by the flowable propping compositions of the present invention. The flowable propping compositions of the present invention do not use spherical or substantially spherical solid proppant particulates. Thus, the flowable propping compositions of the present invention are not theoretically limited to the percentage of void volume or pore space that caps the porosity and permeability of common proppant packs. Given the same interconnectivity between void volumes or pores, a higher porosity material will also have greater permeability. Greater permeability generally leads to higher recovery rates of oil and gas from a formation. Additionally, the flowable propping compositions should be free of the embedment and debris issues facing common solid proppant particulates.

It is also believed that since the propping compositions of the present invention are not discrete particulates, the present invention is better suited to withstand high subterranean stresses compared to common proppants. Commonly packed proppants are point loaded such that each particulate makes contact with other proppant grains and/or formation fracture face within a localized area. This can amplify the stress imparted on the proppant particulates, which ultimately may require higher strength proppant materials.

The compositions and methods of the present invention may also enhance conductivity by creating well interconnected pores within the propping composition, which in turn increases permeability. The compositions of the present invention should have long term economic benefits resulting from greater recovery of oil and gas and use of cost-effective materials.

The methods of the present invention generally comprise providing a fracturing fluid and a flowable propping composition comprising a hardenable external phase and an internal phase wherein the internal phase is immiscible with the external phase. The fracturing fluid and the flowable propping composition are introduced into a subterranean formation where the hardenable external phase is hardened to form a hardened external phase in the fracture in the subterranean formation. After the external phase is hardened, the presence of the internal phase is reduced from the hardened external phase thereby leaving a void volume in the hardened external phase.

In some embodiments, the fracturing fluid and the flowable propping composition may be introduced sequentially in the subterranean formation. In general, it is desirable that the fracturing fluid enhances or creates a fracture prior to introduction of the flowable propping composition.

In some embodiments, the methods of the present invention generally comprise: providing a fracturing fluid that comprises a flowable propping composition comprising: a hardenable external phase and an internal phase wherein the internal phase is immiscible with the external phase; introducing the fracturing fluid into a subterranean formation; hardening the external phase thereby preventing closure of the fracture; and removing the internal phase from the hardened external phase thereby leaving a void volume. In some embodiments, the flowable propping composition may be used as the fracturing fluid.

In some embodiments, the fracturing fluids that may be used in conjunction with the present invention comprise a base fluid and a gelling agent. In some embodiments, the fracturing fluid may be a gel or a foam. Typically, the main components for fracturing gel are a base liquid (water or oil based) and hydrocarbons. Foams may be formed by introducing gasses and surfactants. Suitable gasses include, but are not limited to, nitrogen and carbon dioxide. In some embodiments, the fracturing fluid may be viscosified by using appropriate polymers, buffers, crosslinkers, and stabilizers. The fracturing fluids may also be treated with drag reducers. Drag reducers may be particularly useful when gelling agents are not present. Optionally, the fracturing fluids may further comprise water, hydrocarbons, gels, gelling polymers, friction reducers, crosslinkers, breakers, nitrogen gas, carbon dioxide gas, surfactants, buffers, stabilizers, drag reducers, fluid loss additives, surfactants, fluid loss additives, scale control chemicals, biocides, and combinations of these.

In some embodiments, the base fluid of the fracturing fluid may be an aqueous-based fluid, a hydrocarbon-based fluid (e.g., kerosenes, biodiesels, environmentally friendly hydrocarbons, crude oils, and diesels), an emulsion, a gel, a foamed fluid, combinations thereof or derivatives thereof. In some embodiments, the gelling agent of the fracturing fluid may be polysaccharides, biopolymers, synthetic polymers or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives and combinations of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents are polymers and/or copolymers consisting of various ratios of acrylic, acrylamide, acrylamidomethylpropane sulfonic acid, quaternized dimethylaminoethylacrylate, quaternized dimethylaminoethylmethacrylate, mixtures thereof, and the like.

In some embodiments, the fracturing fluid creates a filter cake on the fracture face in the subterranean formation. This filter cake may be a non-damaging filter cake. Without being limited by theory, it is believed that the filter cake will prevent the hardenable material from entering rock pores and damaging the flow from the formation into the fracture system.

The removal of the internal phase materials from the hardened external phase materials creates a void volume in the hardened external phase. The void volume may be interconnected so as to allow for the flow of fluids through the hardened external phase. In general, it is desirable that the void volume in the hardened external phase is an interconnected porous network. The hardened external phase also serves to prop the fracture. It is believed that the reduction in the presence of the internal phase is enhanced or made easier by the immiscibility of the internal phase with the external phase. It is believed that certain tunable or controllable characteristics of the hardened external phase (e.g., porosity, connectivity, size, etc.) may affect the fracture conductivity. In general, the greater the porosity and interconnectivity between the void volumes, the greater the fracture conductivity.

In some embodiments, the internal phase material may undergo self-assembly or self-organization such that greater interconnectivity between the void spaces is achieved. For example, in a flowing field, an internal phase material may self-orient at the centerline thereby creating interconnected void space within the external phase. In some embodiments, the internal phase material may be a high aspect ratio shape such as, but not limited to, fibers or filaments. It is also believed that these high aspect-ratio shapes will tend to self-align with the direction of an external flow.

It is generally desirable that the hardenable external phase of the flowable propping composition is flowable. When using high load bearing strength materials as the hardened external phase of the flowable propping composition, larger void volumes are possible and thus result in greater porosity than the theoretical limit for solid proppant particulates. The hardenable external phase should be able to flow into fractures, become hard, and provide load bearing strength to prevent the closure of the fractures. Ideally, the hardened external phase materials should be strong enough to withstand the closure pressure of the fractures throughout the production of the fracture.

In some embodiments, the external phase may be reinforced composite materials or polymerizable materials. Suitable examples of the external phase include cement before setting, cement foam, polymer, resin, aluminum and any combinations of these. In some embodiments the external phase may comprise a flowable carrier fluid and a filler material that provides additional strength once the external phase hardens.

Suitable examples of filler material include carbon nanotubes, buckyballs, silicas, metals, and the like. In some embodiments, the filler material may be present in about 1% to about 50% by weight of the flowable propping composition. Suitable examples of resins include, but are not limited to, organic resins such as polyepoxide resins (e.g., bisphenol a-epichlorihydrin resins), polyester resins, urea-aldehyde resins, furan resins, urethane resins, and mixtures thereof. The selection of the external phase may depend on a variety of factors including, but not limited to, the closure pressures of the fractures and the specific internal phase being used. These factors shall be evident to those skilled in the relevant art.

It is generally desirable that the internal phase of the flowable propping compositions is immiscible with the external phase of the flowable propping compositions. Once the hardenable external phase hardens to a hardened external phase, the internal phase should be removable thereby leaving a void volume within the hardened external phase of the flowable propping composition.

In some embodiments, the internal phase may be removed or reduced from the hardened external phase by contacting the internal phase with a treatment of acids, bases, chelants, oxidizers, solvents, and any combinations of these. In some embodiments, the internal phase may be self-degradable or degradable without the external addition of acids, bases, chelants, oxidizers, solvents, and such. In some embodiments, the internal phase may also be self-degradable or degradable without the external addition of acids, bases, chelants, oxidizers, solvents, and such. As used herein, "degradable" refers to a material that is self-destructible, self-degradable, acid degradable, water-soluble and the like. The parameters of the void volume within the hardened external phase (e.g., total volume, connectivity, etc.) will depend on the internal phase used.

The materials used to form the internal phase can be of any physical phase such as gas, liquid, or solid. Suitable examples of internal phase include, but are not limited to, nitrogen, carbon dioxide, air, oils, silicone oils, water, polylactic acids, polyesters, polycaprolactones, polyvinyl alcohols, polyethylene teraphtaltes, chitins, chitosans, proteins, aliphatic polyesters, poly(glycolides), poly(hydroxybutyrates), poly(anhydrides), aliphatic polycarbonates, poly (orthoesters), poly(amino acids), poly(ethylene oxides), polyphosphazenes, anhydrous borates, anhydrous boraxes, anhydrous boric acids, any derivatives of these, and any combinations of these. In some embodiments, the internal phase may be present in an amount from about 30% to about 70% by volume of the flowable propping system. In some embodiments, the internal phase may be oil-soluble or water-soluble.

The flowable propping compositions of the present invention comprise a hardenable external phase and an internal phase wherein the internal phase is immiscible with the external phase. It is generally desirable for the internal phase to be removable from the flowable propping composition once the hardenable external phase is hardened to allow for fluid conductivity through the fracture. As used herein, "flowable" refers to the ability of a body of matter (typically liquid, gas, loose particulate solid, or combinations thereof) to flow or be pumped. Examples of flowable matter include, but are not limited to, water, emulsion, oil, gas, liquid/solid systems (e.g., water-soluble particles suspended in non-aqueous solution) and the like. As used herein, "hardenable" refers to the ability of a body of matter (typically liquid or gas) to be hardened to solid state. Examples of hardenable matter include, but are not limited to, resins, plastics, cement, and the like. The hardenable material may undergo a hardening process, which is typically a chemical reaction, or a change in composition.

The following non-limiting prophetic examples are provided to demonstrate the use of a particularly preferred embodiment of the present invention.

Example 1

In a prophetic application of hydraulic fracturing, a foamed cement slurry is formulated. This foamed cement slurry is comprised of hydraulic cement, carbon nanotubes, an amount of water (about 38% to about 90% by weight of hydraulic cement) sufficient to form a pumpable slurry, and nitrogen gas. The nitrogen gas may be added in an amount ranging from about 30% to about 70% by volume based on the total volume of the foamed cement fluid. The carbon nanotubes may be present in an amount ranging from about 1% to about 50% by weight of the foamed cement fluid and can provide additional load bearing strength against closure pressure. The overall density of the foamed cement slurry should be from about 4.5 lb/gal to about 10 lb/gal. The specific concentrations used may depend on a variety of factors apparent to those skilled in the art. These factors include, but are not limited to, desired permeability, depth of fracture, cost of materials, and the like.

The first step involves introducing a fracturing fluid into a subterranean formation at a pressure sufficient to create or enhance fractures. This fracturing fluid is also useful in that it can act as a non-damaging filter cake that prevents foamed cement slurry from entering into the pores. Next, the foamed cement fluid is pumped into the fractures where it can harden. The resulting hardened cement composition should have a permeability of about 0.3 darcies to about 30 darcies and have enough load bearing strength to prevent closure of the fracture. The hardened cement composition then serves as a permeable conduit through which oil or gas can be recovered.

Example 2

In a second prophetic application, a hydraulic fracturing fluid (e.g., "CLEANSTIM™" commercially available from Halliburton Energy Services, Inc.) is pumped at a pressure sufficient to create or enhance fractures in a subterranean formation. Next, a flowable resin composition containing carbon nanotubes (filler) at a concentration of about 1% to about 50% by weight of the flowable resin composition and hydrocarbon soluble fibers (insoluble in the flowable resin composition) at volume concentrations of about 20% to about 70% is pumped into the subterranean formation. The resin composition is allowed to harden after which point recovery of hydrocarbons may commence. Once production begins, the hydrocarbon soluble fibers are then removed by the flow of reservoir hydrocarbons through the permeable conduit created by the hardened resin composition.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A propping composition comprising:
   a hardenable, liquid phase selected from the group consisting of: a cement, a cement foam, a polymer, a resin, and any combination thereof; and
   an internal phase that is either gas or liquid and that is immiscible with the liquid phase and the internal phase is present in an amount from about 30% to about 70% by volume;
   wherein the internal phase exits the propping composition as the hardenable liquid phase hardens, leaving behind a hardened, interconnected porous network material,
   wherein the propping composition is not a discrete particulate.

2. The propping composition of claim 1 wherein the hardenable, liquid phase of the propping composition is a resin selected from the group consisting of: a polyepoxide resin, a polyester resin, a urea-aldehyde resin, a furan resin, a urethane resin, any derivative thereof, and any combination thereof.

3. The propping composition of claim 1 wherein the hardenable, liquid phase further comprises a filler material comprising a solid selected from the group consisting of: a carbon nanotube, a buckyball, a silica, a metal and any combination of these.

4. The propping composition of claim 1 wherein the internal phase comprises at least one material selected from the group consisting of: nitrogen gas, carbon dioxide gas, air, oil, silicone oil, water, polylactic acid, a polyester, polycaprolactone, polyvinyl alcohol, polyethylene teraphtalte, chitin, a chitosan; a protein, an aliphatic polyester, a poly (glycolide), a poly(hydroxybutyrate), a poly(anhydride), an aliphatic polycarbonate, a poly(orthoester), a poly(amino acid), a poly(ethylene oxide), a polyphosphazene, an anhydrous borate, an anhydrous borax, an anhydrous boric acid, and any combination thereof.

5. The propping composition of claim 1 wherein the internal phase of the flowable propping composition is degradable.

6. The propping composition of claim 1 further comprising a fracturing fluid comprising: a base fluid and a gelling agent.

7. The propping composition of claim 6 wherein the fracturing fluid further comprises at least one selected from the group consisting of: a water, a hydrocarbon, a gel, a gelling polymer, a friction reducer, a crosslinker, a breaker, a nitrogen gas, a carbon dioxide gas, a surfactant, a buffer, a stabilizer, a drag reducer, a fluid loss additive, and any combination thereof.

* * * * *